United States Patent

(12) United States Patent
Brandon

(10) Patent No.: US 12,327,486 B1
(45) Date of Patent: Jun. 10, 2025

(54) MODULAR MAMMALIAN INFANT HEAD MODEL FOR ORAL EXAMINATION TRAINING

(71) Applicant: Kirra Brandon, Annapolis, MD (US)

(72) Inventor: Kirra Brandon, Annapolis, MD (US)

(73) Assignee: HIMM Holdings, Annapolis, MD (US)

( * ) Notice: Subject to any disclaimer, the term of this patent is extended or adjusted under 35 U.S.C. 154(b) by 237 days.

(21) Appl. No.: 17/206,199

(22) Filed: Mar. 19, 2021

(51) Int. Cl.
*G09B 23/34* (2006.01)
*G09B 23/28* (2006.01)

(52) U.S. Cl.
CPC .................................. *G09B 23/283* (2013.01)

(58) Field of Classification Search
CPC ...... G09B 23/28; G09B 23/283; G09B 23/30; G09B 23/32; G09B 23/34; A63H 3/16; A63H 3/36; A63H 3/365
See application file for complete search history.

(56) References Cited

U.S. PATENT DOCUMENTS

| | | | | |
|---|---|---|---|---|
| 1,916,578 A | * | 7/1933 | Samuel | A63H 3/36 433/140 |
| 2,781,611 A | * | 2/1957 | Bills | A63H 3/001 446/295 |
| 4,073,071 A | * | 2/1978 | Angelotti | G09B 23/283 434/185 |
| 4,439,162 A | * | 3/1984 | Blaine | G09B 23/34 434/273 |
| 5,314,339 A | | 5/1994 | Aponte | |
| 5,348,510 A | * | 9/1994 | DuPont | A63H 3/365 2/209.12 |
| 5,823,787 A | | 10/1998 | Gonzalez et al. | |
| 6,780,017 B2 | | 8/2004 | Pastrick et al. | |
| 6,988,894 B2 | * | 1/2006 | Lee | G09B 23/28 434/262 |
| 7,083,419 B2 | | 8/2006 | Winslow | |
| 7,284,986 B2 | | 10/2007 | Winnike et al. | |
| 10,045,804 B2 | * | 8/2018 | Sevrain | F16B 39/04 |
| 10,909,885 B2 | * | 2/2021 | Eichhorn | G09B 23/34 |
| 2010/0099067 A1 | * | 4/2010 | Agro' | G09B 23/34 434/272 |

(Continued)

FOREIGN PATENT DOCUMENTS

GB 2579817 A * 7/2020 ............. G09B 23/28

OTHER PUBLICATIONS

"Screening for Oral Cancer: Recommendation Statement," Mabry-Hernandez et al., Am Fam Physician, vol. 91(6). (Mar. 2015). pp. 387-388 (Year: 2015).*

(Continued)

*Primary Examiner* — Kurt Fernstrom
(74) *Attorney, Agent, or Firm* — Christensen, Fonder, Dardi & Herbert PLLC; John P. Fonder

(57) ABSTRACT

A modular mammalian infant head mannequin representing a human infant head and neck, anatomically particularized, infant aged and real sized with real motions. Special care is posed in selecting the materials in order to resemble the natural texture of human tissues. The aim of the head mannequin is to allow the acquisition of medical skills in the field of infant oral defects (defects of the tongue frenulum, and defects of the palate) through interchangeable modules simulating a plurality of anatomical variabilities ("inserts").

20 Claims, 5 Drawing Sheets

(56) References Cited

U.S. PATENT DOCUMENTS

| | | | |
|---|---|---|---|
| 2012/0021397 A1* | 1/2012 | Van Dalen | G09B 23/30 |
| | | | 434/271 |
| 2014/0106326 A1* | 4/2014 | Hemmer | G09B 23/283 |
| | | | 434/264 |
| 2017/0358248 A1* | 12/2017 | Podolsky | G09B 23/306 |
| 2020/0211419 A1* | 7/2020 | Hiyama | G09B 23/28 |
| 2021/0280088 A1* | 9/2021 | Sedberry | G01D 21/02 |
| 2022/0139265 A1* | 5/2022 | Dunham | G09B 23/34 |
| | | | 434/270 |
| 2023/0368701 A1* | 11/2023 | Pannaci Padron | G09B 23/283 |
| 2024/0242632 A1* | 7/2024 | Hackman | G09B 23/303 |
| 2024/0257665 A1* | 8/2024 | Orebaugh | G09B 23/285 |

OTHER PUBLICATIONS

"'Real' Early Orthodontic Treatment," D. Page, the Functional Orthodontist (2003), pp. 48-58 (Year: 2003).*

* cited by examiner

MODULAR MAMMALIAN INFANT HEAD MODEL FOR ORAL EXAMINATION TRAINING

BACKGROUND OF THE INVENTION

The present invention relates to the field of medical training and tactile training for physicians, nurses, and lactation consultants. More specifically, this invention comprises a mannequin aimed for 40 medical training and identification. The mannequin allows users to simulate the practice of multiple medical inspections, such as bubble palate, channel palate, high palate; and frenulum issues of the tongue at varying degrees also known as "tongue tied."

BRIEF DESCRIPTION OF THE RELATED ART

In order to improve the field of training and identification with the development of alternative methods which are not centered on patients, many research institutes are developing new human simulators. Further, many enterprises are offering new integrated simulation systems. Various mannequins for medical training currently exist. For example, U.S. Pat. No. 5,823,787 discloses a training mannequin for management of normal and abnormal airways. Other examples include U.S. Pat. No. 7,284,986 entitled "Medical training aid having inflatable airways," U.S. Pat. No. 5,314,339 entitled Educational Medical Mannequin," U.S. Pat. No. 7,083,419 entitled "Doll for demonstrating a medical procedure" and U.S. Pat. No. 6,780,017 entitled "Cardiopulmonary resuscitation manikin with replaceable lung bag and installation tool." None of the known mannequins, however, provides the chance to train different medical procedures or identification acts in a an infant for oral abnormalities. Moreover, the existing mannequins do not adequately represent the human variability to adequately allow for training and identification of infant oral abnormalities.

SUMMARY OF THE INVENTION

The present invention is a mannequin representing a human head, anatomically particularized, infant aged and real sized with real motions. Special care is posed in selecting the materials in order to resemble the natural texture of human tissues.

The aim of the mannequin is to allow the acquisition of medical skills in the field of oral abnormalities through interchangeable modules acting endless anatomical variabilities ("inserts"). In a preferred embodiment, the present invention is a mannequin for medical training. The mannequin comprises a head having a front and a back. The front and back each comprise a plurality of modules for simulating anatomical structure of the skin, muscles, fats, and skull. The head further comprises two channels in the skull for inserting an upper and lower mandible super-structure. The mouth, face, and jaw move relative to the neck to realistically simulate movement of a human head. The mannequin further may have interchangeable palates and tongues to simulate oral abnormalities such as tongue frenulum of differing lengths and widths and mouth palates with varying anatomical abnormalities. Still further, the interchangeable modules may simulate physiologic and pathologic anatomical conditions. The mannequin for simulating medical training may be sized to simulate an adult human, an adolescent human, a child human or an infant human. The materials used to construct the mannequin preferably resemble a natural texture of human tissue. Such materials used to construct the mannequin may for example, be silicone, thermoplastic elastomer, and thermoplastic polyurethane.

The interchangeable "inserts" of the mannequin may comprise a plurality of interchangeable modules, for example, to simulate physiologic and pathologic anatomical conditions. One of the interchangeable modules of the mouth may comprise, for example, materials simulating tissues and structures of a palate region of a human body. Such tissues and structures of a palate region of a human body may comprise any or all of skin, subcutaneous fat, muscles, ligaments, cartilages, vessels, rugae and bone. The vessels in the mannequin may be filled with artificial blood or saliva. Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which.

Figure 1:
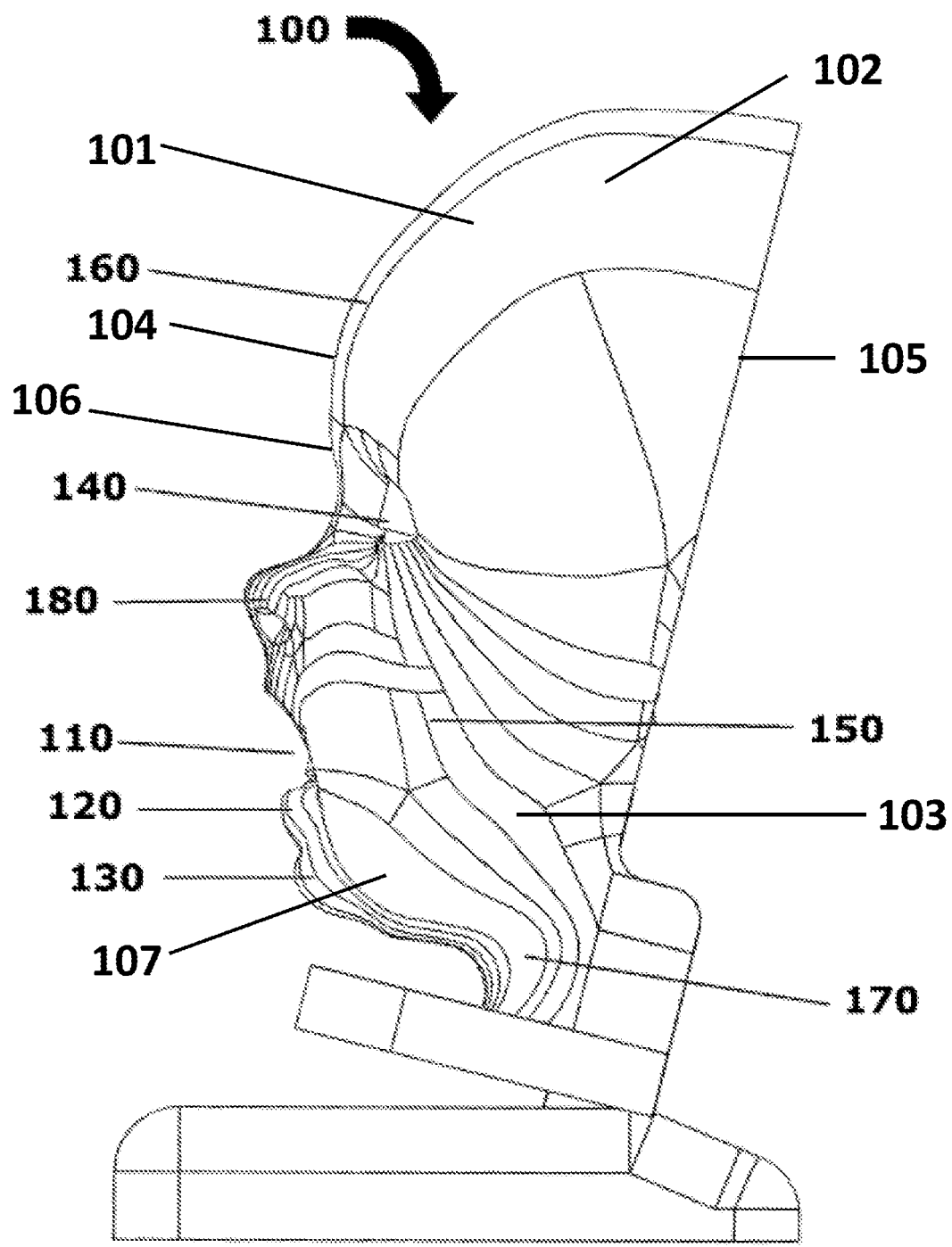
FIG. 1 is a side view of a preferred embodiment of a mannequin in accordance with a preferred embodiment of the present invention.
Figure 2:
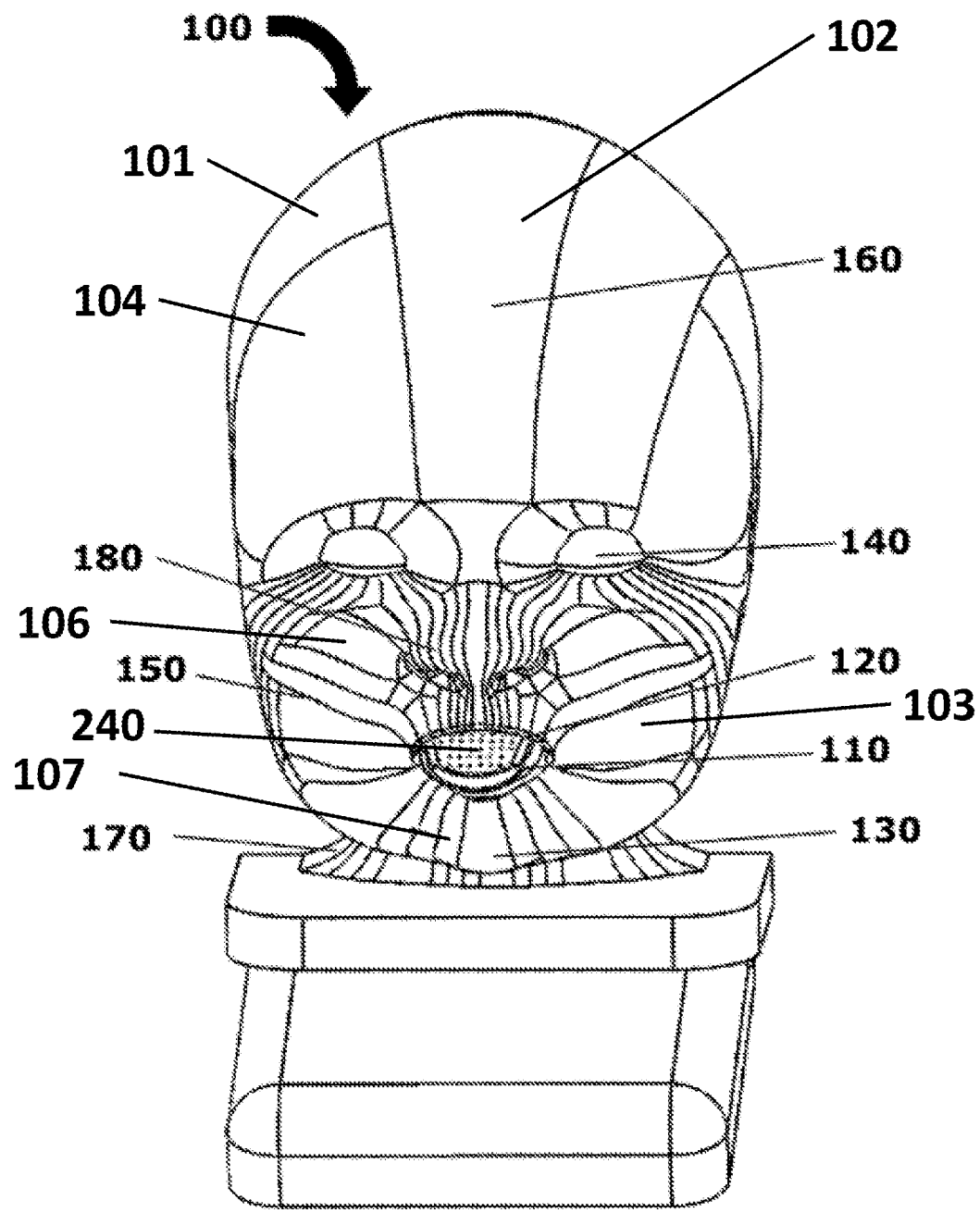
FIG. 2 is a perspective view of a mannequin in accordance with a preferred embodiment of the present invention.

All broken lines and text are for the purposes of identifying features and form no part of the claimed design.

DETAILED DESCRIPTION OF THE PREFERRED EMBODIMENTS

Reference will now be made in detail to the presently preferred embodiments of the invention, examples of which are illustrated in the accompanying drawings. Throughout the following detailed description, the same reference numerals refer to the same elements in all figures.

The mannequin 100 represents a human head for purposes of training. The mannequin 100 is anatomically particularized with a head portion 101, an upper portion 102, lower portion 103, front side 104, back side 105, face 106, mouth 110 defining an oral cavity and through opening, lips 120, chin 130, eyes 140, cheeks 150, forehead 160, neck 170 and nose 180. In a preferred embodiment, the mannequin 100 is sized and proportioned to simulate an infant aged human. As shown in FIG. 1-4, the mannequin 100 simulates real motions. The aim of the mannequin is to allow the acquisition of medical skills in the field of oral abnormalities through interchangeable modules, or insertable portions 230 and 240 (as described further below), acting endless anatomical variabilities ("inserts"). In a preferred embodiment, special care is posed in selecting the materials used to construct the mannequin in order to resemble the natural texture of human tissues. The texture and the features of the face and neck are carefully defined in order to allow proper manipulation and facial deformity when a finger is placed into the mouth or oral cavity 110, which forms a through opening. Lips and cheeks are narrowly particularized so that the feasible simulation of techniques such as rolling the tongue and moving the lower mandible 107 are possible.

Figure 3:
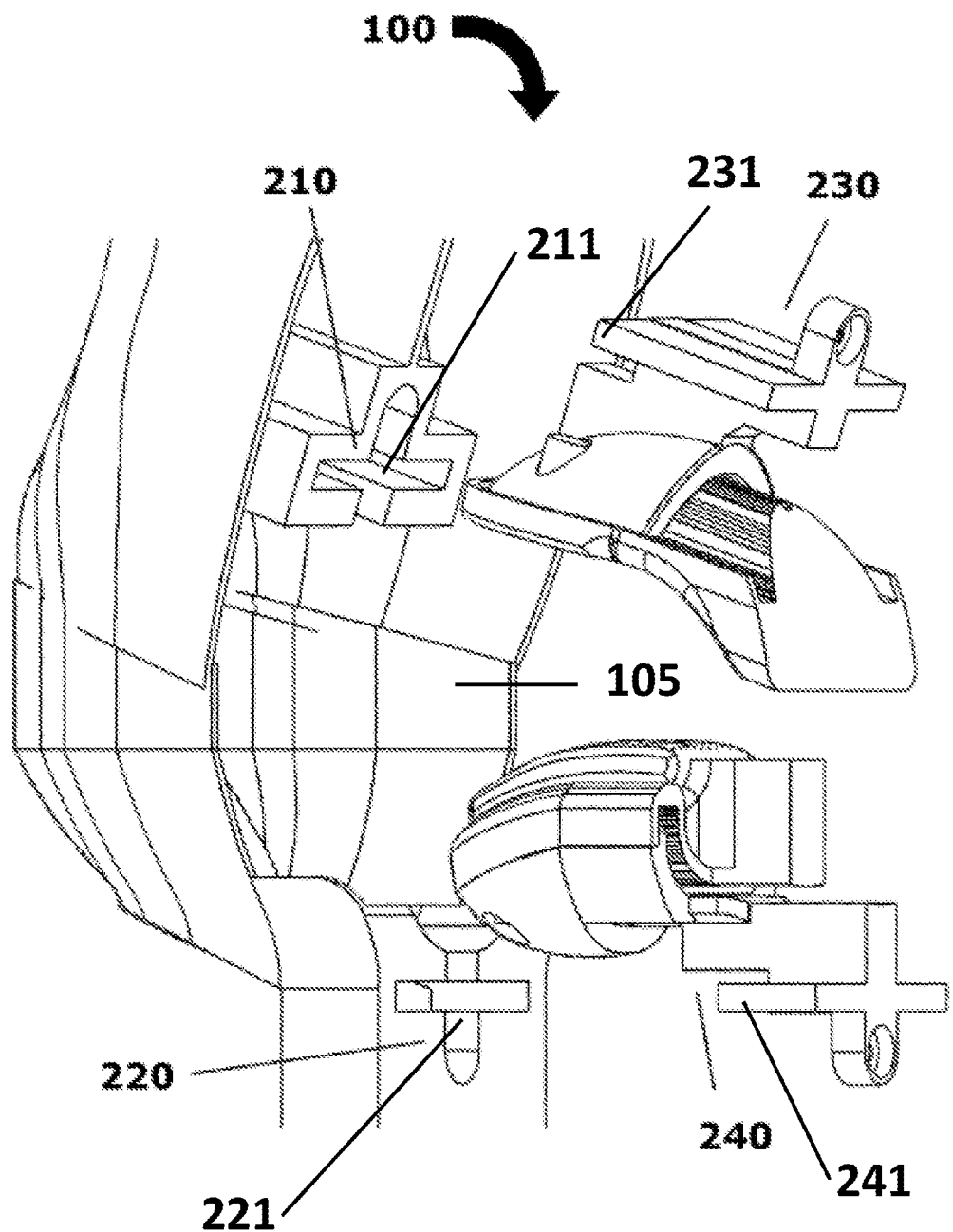
FIG. 3 is a side view of an upper and lower mandible inserts in accordance with a preferred embodiment of the present invention to illustrate axis of insertion into the figure from a side view in accordance with a preferred embodiment of the present invention.
Figure 4:
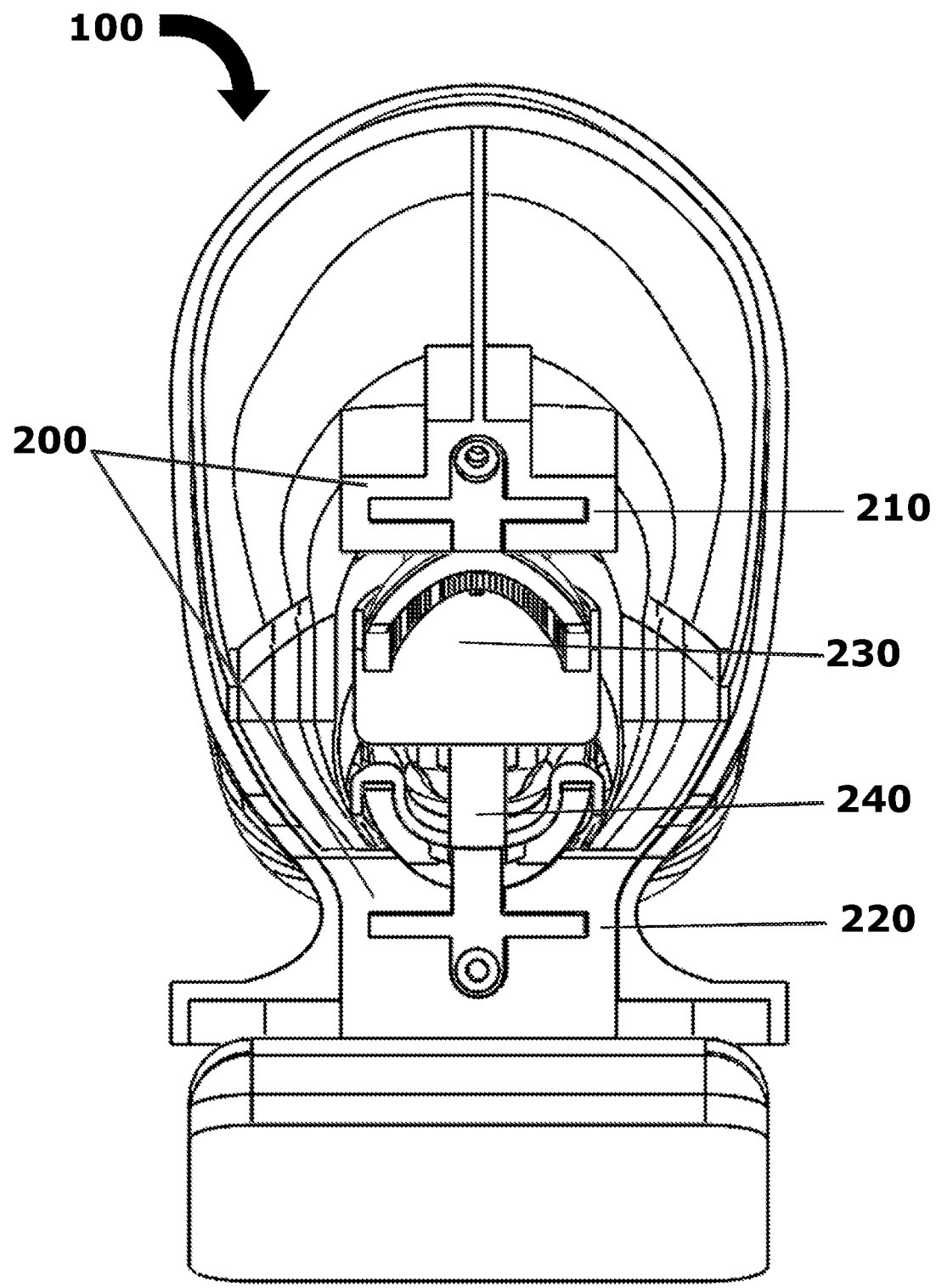
FIG. 4 is a rear view of a mannequin in accordance with a preferred 130 embodiment of the present in invention with and upper and lower mandible inserted in accordance with a preferred embodiment of the present invention.
Figure 5:
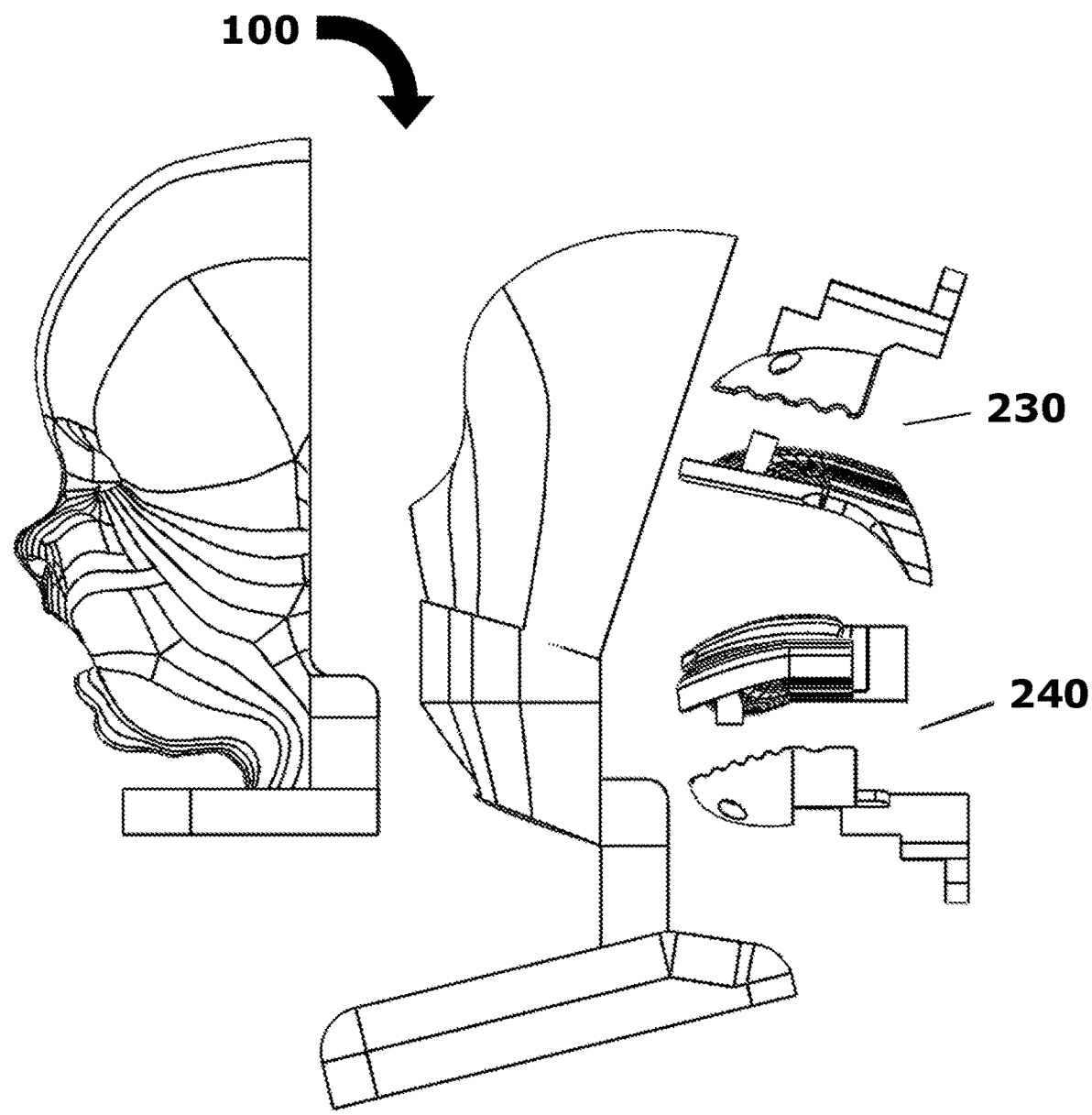
FIG. 5 is an exploded view of a mannequin in accordance with a preferred embodiment of the present in invention.

As shown in FIGS. 3-5, the mannequin's back of head comprises upper or first attachment region 210 with one or more slots 211 and lower or second attachment region defining one or more slots 221 for an upper mandible slot 211 and a lower mandible slot 221 for receiving interchangeable palate modules (insertable portions) 230 and tongue modules (insertable portions) 240 that simulate physiologic, and pathologic anatomical conditions and abnormalities. In each module there are all the tissues and the structures which constitute the palate and tongue: skin, subcutaneous fat, muscles, ligaments, cartilages, vessels, bone, and rugae.

As show in FIG. 3 and FIG. 5 each palate module 230 and tongue module 240 is further comprised of a semi-rigid superstructure 250 and 260 which is then connected to a human tissue like soft palate 270 or tongue 280 respectively allowing for realistic feel and movement of the anatomical features.

The tissues of the mannequin or simulator are made of different materials: polymers as the Silicone, Thermoplastic Elastomer (TPE), Thermoplastic Polyurethane (TPU) or silicone elastomers as the Polydimethylsiloxane (PDMS). The vessels can be filled with artificial blood or saliva. The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A mannequin for medical training and identification of infant oral abnormalities, comprising:
    a mannequin infant-head portion including an upper portion, a lower portion, a front side and a rear side, the rear side defining a rear access opening, the front side defining a front opening simulating an infant oral cavity, the rear side including an upper attachment region accessible through the rear access opening and a lower attachment region accessible through the rear access opening;
    a mannequin face on the front side of the mannequin infant-head portion and extending across the upper portion of the mannequin infant-head portion and the lower portion of the mannequin infant-head portion;
    a first plurality of insertable portions, each insertable portion of the first plurality of insertable portions including a palate-attachment portion and a palate-simulation portion simulating an infant palate, and each insertable portion of the first plurality of insertable portions configured to be inserted through the rear access opening and the palate-attachment portion configured to removably attach to the upper attachment region of the mannequin infant-head portion, thereby removably securing the insertable portion of the first plurality of insertable portions to the mannequin infant-head portion; and
    a second plurality of insertable portions, each insertable portion of the second plurality of insertable portions including a tongue-attachment portion and a tongue-simulation portion simulating an infant tongue, and each insertable portion of the second plurality of insertable portions configured to be inserted through the rear access opening and the tongue-attachment portion configured to removably attach to the lower attachment region of the mannequin infant-head portion thereby removably securing the insertable portion of the second plurality of insertable portions to the mannequin infant-head portion;
    wherein one of the first plurality of insertable portions simulates an anatomically-normal infant palate and one of the first plurality of insertable portions simulates an anatomically-abnormal infant palate; and
    wherein one of the second plurality of insertable portions simulates an anatomically-normal infant tongue and one of the second plurality of insertable portions simulates an anatomically-abnormal infant tongue.

2. The mannequin of claim 1, wherein materials used to construct each of the first plurality of insertable portions and each of the second plurality of insertable portions resemble a natural texture of human tissue, the materials comprising at least one of: silicone, thermoplastic elastomer, and thermoplastic polyurethane.

3. The mannequin of claim 1, wherein the upper attachment region defines a first slot, and each insertable portion of the first plurality of insertable portions includes a first projection configured to be received by the first slot.

4. The mannequin of claim 3, wherein the lower attachment region defines a second slot, and each insertable portion of the second plurality of insertable portions includes a second projection configured to be received by the second slot.

5. The mannequin of claim 1, further comprising a mannequin neck portion connected to the mannequin infant-head portion, wherein the mannequin neck portion is configured to move relative to the mannequin infant-head portion to realistically simulate movement of a human body.

6. The mannequin of claim 5, wherein the mannequin neck portion comprises material resembling a natural texture of human tissue, the materials comprising at least one of: silicone, thermoplastic elastomer, and thermoplastic polyurethane.

7. The mannequin of claim 1, wherein the mannequin face comprises material resembling a natural texture of human tissue, the materials comprising at least one of: silicone, thermoplastic elastomer, and thermoplastic polyurethane.

8. The mannequin of claim 1, wherein the one of the first plurality of insertable portions that simulates an anatomically-abnormal infant palate simulates one of a bubble palate, a channel palate and a high palate.

9. The mannequin of claim 8, wherein the first plurality of insertable portions includes four insertable portions.

10. The mannequin of claim 9, wherein the first plurality of insertable portions includes insertable portions that respectively simulate an anatomically-normal infant palate, an anatomically-abnormal bubble palate, an anatomically-abnormal channel palate, and an anatomically-abnormal high palate.

11. The mannequin of claim 1, wherein the one of the second plurality of insertable portions that simulates an anatomically-abnormal infant tongue simulates an infant tongue with a frenulum issue.

12. The mannequin of claim 11, wherein the second plurality of insertable portions includes four insertable portions.

13. The mannequin of claim 11, wherein the second plurality of insertable portions includes insertable portions that respectively simulate an anatomically-normal infant tongue, a first anatomically-abnormal tongue with a first frenulum issue, and a second anatomically-abnormal tongue with a second frenulum issue.

14. The mannequin of claim 13, wherein the first anatomically-abnormal tongue has a frenulum length that is longer than a frenulum length of the second anatomically-abnormal tongue.

15. The mannequin of claim 13, wherein the first anatomically-abnormal tongue has a frenulum width that is longer than a frenulum width of the second anatomically-abnormal tongue.

16. The mannequin of claim 1, further comprising a mannequin mandible portion connected to the mannequin infant-head portion.

17. The mannequin of claim 16, wherein the lower attachment region defines a slot in the mannequin mandible portion.

18. The mannequin of claim 1, wherein the rear access opening is defined by both the lower portion and the upper portion.

19. The mannequin of claim 1, wherein the palate-attachment portion forms a cross shape, and the upper attachment region defines a cross shape that is complementary to the cross shape of the palate-attachment portion and configured to receive the cross shape of the palate-attachment portion.

20. The mannequin of claim 1, wherein the palate-attachment portion is attached to a top portion of the palate-simulation portion, and the tongue-attachment portion is attached to a bottom portion of the tongue-simulation portion.

* * * * *